UNITED STATES PATENT OFFICE.

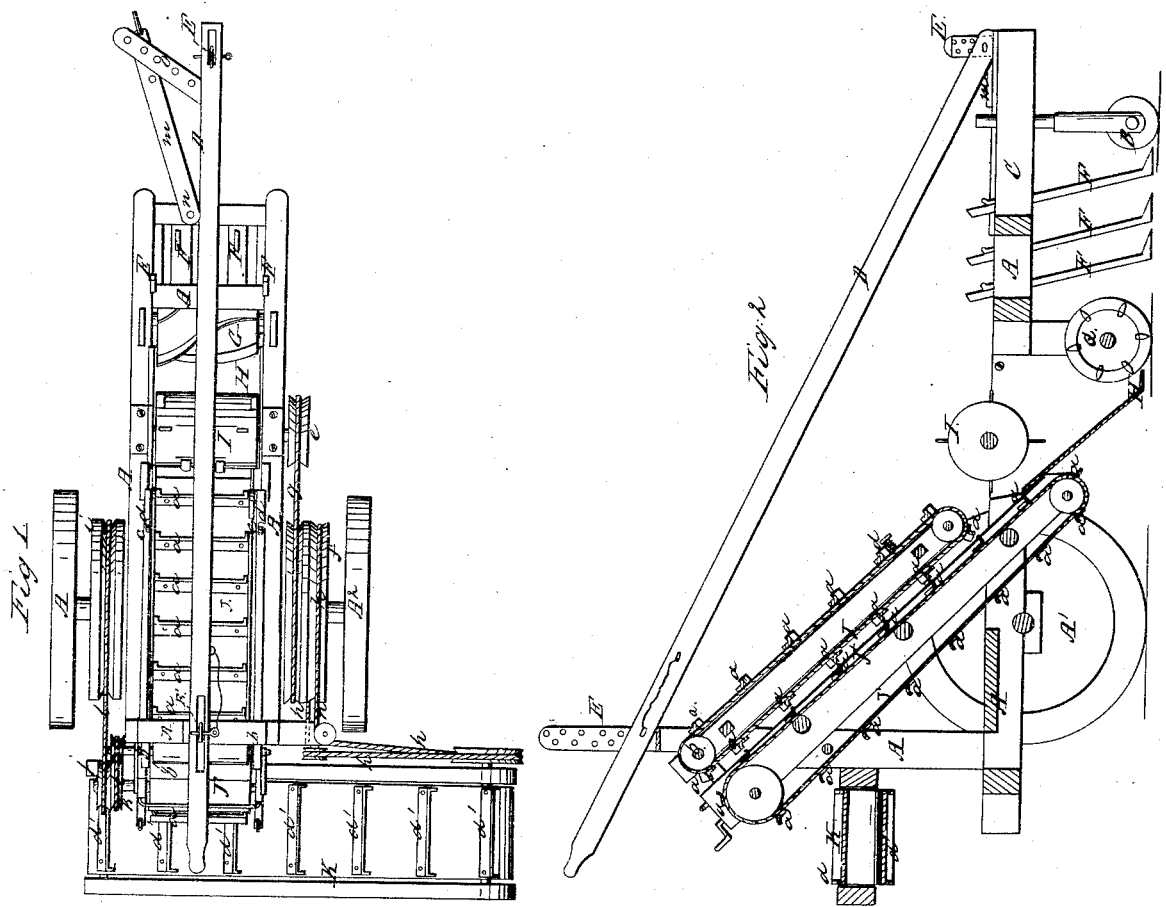

Z. N. MORREL, OF CAMERON, TEXAS.

EXCAVATING AND GRADING MACHINE.

Specification of Letters Patent No. 24,816, dated July 19, 1859.

*To all whom it may concern:*

Be it known that I, Z. N. MORREL, of Cameron, in the county of Milam and State of Texas, have invented a new and useful Improvement in Grading-Machines; and I do hereby declare that the following is a full, clear, and exact description of the same, reference being had to the accompanyings drawings, forming a part of this specification, in which—

Figure 1, is a plan or top view of a grading machine with my improvements applied to it. Fig. 2, is a vertical central section of the same.

Similar letters of reference, in each of the several figures indicate corresponding parts.

The nature of my invention consists, first, in the employment of a revolving cylinder of blades arranged at the lower end of the inclined digger, in combination with said digger and with a series of coulter plows arranged at the front end of the machine, substantially as and for the purpose hereinafter described.

It consists second, in the employment of a revolving cylinder of teeth or blades arranged at the upper end of the inclined digger, in combination with said digger, substantially as and for the purpose hereinafter described.

By the first feature of my invention, I am enabled to first cut up the soil in long narrow strips and reduce the strips to small clods. By the second feature, I dig up the clods in bulk and pulverize the same.

To enable others skilled in the art, to make and use my invention, I will proceed to describe its construction and operation.

A, represents the frame of the machine. It is mounted on two heavy driving or propelling wheels $A^1$, $A^2$.

B, is the depth gaging wheel. It passes up loosely through the tongue C, of the machine, and bears against an adjusting lever D, pivoted to an adjusting standard E, of the tongue. The lever D, extends back to the driver's seat and is adjustable up and down over an adjusting standard E', as shown. By depressing the lever D, the forward end of the frame with all its attachments will be elevated and the plows &c. raised out of the ground or so as to cut the desired depth.

F, F, are the coulter plows for cutting the soil into narrow strips. They are set so as to form a figure similar in shape to the letter V and to plow out of line with one another, as represented. These plows are very similar to ordinary edged coulters and perform a similar office to them.

G, is the revolving transverse cylinder of blades for cutting the soil into small clods, it is arranged behind the coulter plows and so as to have its blades cut just as deep as the same. Its blades may be straight or spiral. The latter shape, however, it is believed will be found most advantageous in practice.

H, is the inclined digger, it is situated behind the cylinder of blades G, and serves to take up the clods in bulk and conduct them up and backward as fast as the narrow strips are divided by the cylinder G.

I, is the revolving cylinder for pulverizing the clods as they arrive at the top of the digger. This cylinder is armed with teeth or narrow blades which strike the clods rapidly and with sufficient force to reduce them to a size suitable for being passed up between the elevator aprons. The blades or teeth of this cylinder also serve for throwing the soil into the buckets of the lower elevator apron.

J, J', are the longitudinal elevator aprons, they are set inclined with the digger. The lower one lies slightly below the bottom of the digger and extends under the upper end of the same. The aprons are placed far enough apart to allow of the buckets $a$, $a$, being placed on them and to allow said buckets in the revolution of the aprons to just pass by or free of each other. As the soil necessarily passes between the apron and the bucket of one apron stand just over the buckets of the other and a liability of clogging or breakage exists, from stones &c. passing up between the apron, I have arranged the upper apron to turn on a horizontal hinge rod at $b$, and to rise and fall over oblique guide rods, against spiral springs $c$, $c$, at $d$, $d$. Thus having the upper apron arranged, allows it a chance to yield or give and thus prevent clogging or breakage. The aprons J, J', run at the same speed and consequently the buckets of one apron always stand opposite the buckets of the other. Thus having the buckets arranged, insures the more perfect elevation of the dirt, as it is securely confined until it arrives at the upper ends of the apron.

K, is the transverse discharging apron, it is arranged at the rear of the machine and below or under the upper end of the elevator aprons. Its buckets $d'$, $d'$, are similar in form and arrangement to the buckets of the elevating aprons. This apron receives the dirt from the elevator aprons and carries it at right angles to the ditch and discharges it at the point where the grade is being formed.

The motion is transmitted to the revolving pulverized and the transverse apron from the axle of driving wheel $A^2$, by means of pulleys $e$, $e$, $f$, $f$, and cords $g$, $h$, arranged as shown in the drawing. And to the elevator aprons from said shaft by means of pulleys $i$, $j$, $k$, and cords $l$, $l$, arranged as shown in the drawing, other character of gearing might be adopted, if desirable.

The machine is set in motion by attaching the beast of draft to the draft rod $m$, said rod being pivoted at $n$, and made adjustable in a slotted perforated clevis $o$, so as to be set more or less at one side of the beam and thus have the animal walk on the edge of the ditch.

What I claim as my invention and desire to secure by Letters Patent, is

1. The employment of a revolving cylinder of blades, arranged at the lower end of the inclined digger, in combination with said digger and with a series of cutter plows arranged at the front end of the machine, substantially as and for the purposes set forth.

2. The employment of a revolving cylinder of teeth or blades arranged at the upper end of the inclined digger in combination with said digger, substantially as and for the purpose set forth.

Z. N. MORREL.

Witnesses:
   G. YORKE AT LEE,
   R. W. FENWICK.